June 14, 1938.　　　M. L. MARTUS ET AL　　　2,120,618
AIR DEPOLARIZED PRIMARY CELL
Filed March 21, 1932
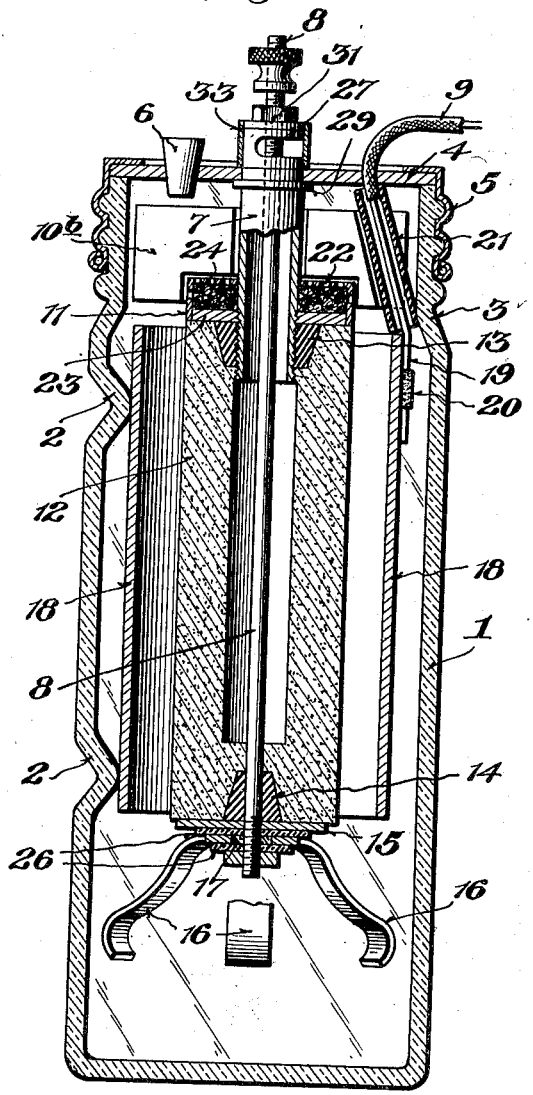
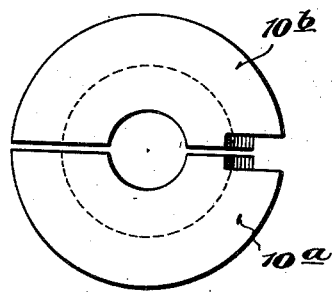
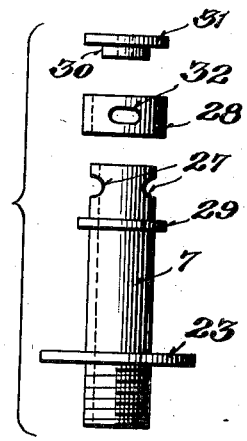
Inventors
Martin L. Martus,
Edmund H. Becker,
By K. P. McElroy
Attorney Patented June 14, 1938

2,120,618

UNITED STATES PATENT OFFICE 2,120,618

AIR-DEPOLARIZED PRIMARY CELL

Martin L. Martus, Woodbury, and Edmund H. Becker, Waterbury, Conn.

Application March 21, 1932, Serial No. 600,274

6 Claims. (Cl. 136—136)

This invention relates to air-depolarized primary cells; and it comprises an air-depolarized cell adapted for use with a caustic electrolyte and having the usual zinc anode, electric connections and container, said cell having an electrode of activated carbon adapted to be submerged below the surface of the electrolyte, the electrode having an interior air chamber out of communication with the electrolyte, and conduit means leading from the chamber to the air; all as more fully hereinafter set forth and as claimed.

As a primary cell, a pair of electrodes, consisting of zinc as anode in a caustic alkali solution, opposed to a carbon electrode depolarized by atmospheric oxygen, as cathode, offers an economic ideal. The electric properties are good and the voltage high and steady; around 1.25 volts. Practical difficulties however arise in realizing this ideal in a commercial cell. Access of air must be permitted and evaporation, creeping of salts and contamination of the caustic with $CO_2$ must be avoided. The available amperage depends on the amount of oxygen adsorbed in a unit of time and this in turn on the area of the carbon electrode exposed to air and in contact with electrolyte.

In a prior patent, No. 1,673,198, whereon the present invention is in some respects an improvement, these conditions were met by various expedients including the use of activated carbon carrying on its surface an extremely small amount of distributed oily matter. This oily matter was not enough to prevent wetting contact of electrolyte and carbon to the extent necessary to carry current but was sufficient to minimize capillarity and to permit the existence of air-filled pores and cavities. Somewhat the same general type of carbon electrode is used in the present invention.

For present purposes, activated carbon may be defined as any carbon which has been submitted to a secondary firing, usually in an atmosphere containing $CO_2$ and $H_2O$, to clean out the pores and get rid of adsorbed gases, vapors and tars. It is really a sort of clean carbon. Activated carbon has not only a high adsorptive power but good electrical conductivity; it gives a better particle-to-particle contact than other varieties of carbon.

In the present invention, the depolarizing electrode is a body of carbon below the surface of the electrolyte and being usually provided with an interior air chamber, the said chamber being in communication with the atmosphere. With a rather roomy chamber, it has been found that diffusion readily takes care of the replenishment of the oxygen content of the included body of air even though communication with the atmosphere is only by means of a conduit of rather small cross section. Before or after forming the electrode, the carbon is activated by heating to 700–800° C. in an atmosphere of steam or products of combustion. Before using the electrode and while it is dry it is water-proofed in a fashion which prevents the absorption of the electrolyte but permits the diffusion of air through the electrode. A suitable method which may be used for waterproofing is described in the acklowledged patent. Heavy lubricating oil, which may be an asphaltic base oil of a viscosity of 90 to 100 seconds Saybolt at 210° F., may be dissolved in carbon tetrachlorid or other wholly volatile solvent to make a 10 to 15 per cent solution. The carbon electrode may then be immersed in or sprayed with this solution. The oil is adsorbed by the pore surfaces and an even distribution secured. The tetrachlorid or solvent may then be distilled off. With commercial decolorizing or activated carbons, having the usual enormous ratio of surface to weight, as much as 20 per cent by weight of lubricating oil can be present in the oiled carbon for the purposes of the present invention, without the occurrence of pore films of inoperative thickness. With carbons of less surface, less oil is used. With any type of carbon and any type of lubricating oil, the amount of oil used should be that which will make the carbon not readily wet by water while not making it actually waterproof. It is possible to arrive at the same type of oiling by adding lubricating oil to the carbon and then partially washing the carbon with benzol, gasoline or carbon tetrachlorid, but this is not so simple and exact.

The "surface tension" phenomena of a caustic soda electrolyte in a cell containing a suitably oiled carbon electrode display useful peculiarities. With circuit closed and current flowing, the electrolyte visibly wets and penetrates the carbon. On opening the circuit this wet look disappears; the electrolyte in a sense is repelled. With a hollow or chambered submerged electrode made under the present invention, if the oiling is properly done the electrolyte does not tend to enter the air chamber through the walls although some hydrostatic head exists favoring this; nor do creeping salts form within this chamber. The amount of $CO_2$ occurring in atmospheric air does not seem to affect the cell; it does not pass outward through the walls into the caustic alkali.

In all cells with caustic alkali solution as an electrolyte, it is usual to shield the alkali by a floating layer of oil; and where this is done, as in the present invention, it is necessary to prevent this oil coming into contact with the carbon, as it will enter and fill the pores. In the present invention, the carbon electrode is completely below the floating layer of oil; hence contamination is impossible.

Our invention may be further described by referring to the accompanying drawing which shows, more or less diagrammatically an operative embodiment of the present invention. In this showing Fig. 1 is a vertical section through the cell with certain parts in elevation;

Fig. 2 is a plan view of the cakes of caustic soda used in the cell, while

Fig. 3 shows a modified form of air conduit which may be used in our invention.

The cell illustrated in the figures is a commercial article requiring only an addition of water to place it in functioning condition. It is usually termed an "add-water type" of cell.

In these figures corresponding parts are indicated by the same reference characters. Element 1 is a glass jar provided with centering lugs 2 spaced 120° apart and a threaded neck 3 of slightly less diameter than the diameter of the jar. Top cover 4 is kept in position by a threaded cap element 5, engaging the threads. The threaded neck 3 is usually made of sufficiently small diameter to prevent the threaded caps on adjacent cells from touching. In the top cover 4 there is an opening closed by stopper 6, for adding water. Through the top passes a metallic sleeve or tubular conduit 7, open to the atmosphere when the cell is in operation and carrying electrical connector rod 8. Through it also passes insulated wire 9 serving as the negative connection. At a point just below the cover there are positioned two cakes of fused caustic alkali, 10a and 10b, serving to make the electrolyte on introduction of water—see Fig. 2.

For convenience in mounting, these cakes are usually made in the shape of the half of an annulus, see Fig. 2. One cake can be made of caustic soda and the other of caustic potash, if desired, or both can be made of the same material. These cakes can be readily welded to a single cake, if desired, by merely moistening the adjacent faces and pressing them together.

As shown, the alkali rests on a sort of annular metal box indicated generally at 11 which also surrounds the tube 7. This box is provided with a detachable perforated top 22. The bottom 23 of this box may be threaded on the conduit 7. Within this box is a body of absorbent material 24, which may be cotton, holding enough absorbed oil to serve as a floating seal when water is added. The box serves as the top closure of chambered carbon electrode 12. The seal 13 of pitch or rubber composition makes a tight connection between conduit and electrode, preventing the entry of water into the chamber. The bottom of the chamber is orificed to receive the rod 8. A tight joint at the bottom is made by seal 14. The rod 8 holds a spring metal spacer 16 serving to center the electrode in the jar. A washer nut 15 is threaded on the lower end of the rod 8 and is clamped against the bottom of the carbon electrode 12, which is thus held firmly between the elements 15 and 23. Both of these elements make electrical connection with the carbon electrode. Insulating bushing 17 and washers 26 serve to insulate the spring spacer 16 from the carbon electrode.

Outside the carbon electrode is an amalgamated zinc sleeve 18 which may be supported by wire 19, soldered or riveted at 20 and passing upward and out of the electrolyte through hard rubber sleeve 21 and cover 4 and continuing as the negative connection 9 previously mentioned.

In Fig. 3 there is shown a modified air conduit which is advantageous for certain purposes. This is formed of a tube 7 with two or more openings 27, in contrast to the single opening shown in the conduit tube of Fig. 1. A sleeve 28 makes a sliding fit around the upper end of the tube 7 and is held in position by the shoulder 29. A cap 30 provided with shoulder 31 fits into the top of tube 7 above the sleeve 28, the cap being threaded on the rod 8. The sleeve 28 is free to turn between the shoulders 31 and 29. This sleeve is provided with holes 32 which may be turned to align with openings 27 in the tube 7, thus serving to provide a controlled air passage leading to the carbon electrode.

Before the cell is placed in operation it is desirable to keep the holes 27 closed to the atmosphere to prevent air from passing into the cell by diffusing through the carbon electrode. The carbon dioxide and moisture in such air would cause gradual deterioration of the caustic alkali and carbon electrode. With the air conduit design shown in Fig. 1 temporary closure may be provided by a viscous or cellophane seal 33, which is broken before placing the cell in operation.

To place the cell in operation cork 6 is removed and water poured in up to and covering the top of the alkali cakes. The water dissolves these cakes. As the level of the electrolyte rises above box 11, oil is liberated and rises to form a floating cover. The cotton or other absorbent is held in place by the preforated cover. On closing the circuit, current flows. The voltage tends to approach 1.25 and remains steady for a long time. The cell works equally well on either open or closed circuit, not being subject to shelf loss.

One of the characteristic features of the present invention is the use of a carbon electrode beneath the level of the electrolyte. In prior designs it has always been attempted to reduce as far as possible the hydrostatic head which tends to force water into the carbon electrode. For this reason the carbon electrode has been only partially submerged and never to any great depth. In the present invention, however, it has been discovered that certain important advantages accrue from the use of a submerged type chambered carbon electrode.

In the partially submerged type of carbon electrode it is necessary that the electrode pass through the layer of oil which is provided on top of the electrolyte. But it is likewise imperative to prevent the carbon electrode from coming in actual contact with the oil layer. Otherwise the carbon would rapidly take up oil and cease to function. It has therefore been necessary to fit a sleeve around the carbon electrode at the oil level or to employ some other expedient to prevent contact with the oil. These methods have not proven entirely satisfactory in practice. In the present design the carbon electrode is below the oil level and hence there is no possibility of contamination with oil.

In prior designs it was thought necessary that the carbon electrode project for some distance into the air to permit free access of oxygen to act as depolarizer. The exposed portion of the electrode is always subject to contamination from oil, etc. A single drop of oil, for example, placed upon the exposed end of such an electrode will eventually put the entire cell out of commission. In the present design this difficulty is effectually overcome. No part of the carbon electrode is directly exposed to contamination.

It has been found that the rate of discharge of the cell can be controlled by the cross section of the conduit 7 or by means of a variable opening in the top of the conduit, such as that shown in Fig. 3. The size of this opening may be adjusted according to the type of service in which the cell is to be placed.

While in the design of the present invention an increased hydrostatic head of electrolyte is employed which tends to force water into the carbon electrode, it has been found that this tendency can be effectually overcome by the presence of a small quantity of a magnesium salt either in the electrolyte or in the electrode structure. Various magnesium salts may be employed such as the chlorid, iodid, carbonate or similar salt. It is obvious, of course, that the addition of these salts is advantageous in preventing wetting of the carbon electrode in all types of air depolarized cells in which a carbon electrode makes effective contact with atmospheric air, for example in the type described in our acknowledged Patent No. 1,673,198.

When a soluble magnesium salt is added to the caustic alkali of a cell a white precipitate forms temporarily. Part of this redissolves and this quantity is sufficient for the present purposes. It is usually desirable to add about 1 per cent by weight of the magnesium salt to the electrolyte but quantities from ½ per cent to 2 per cent are operative.

Instead of adding the magnesium salt to the electrolyte of the present cells, the carbon electrodes can be merely dipped into a dilute solution of such a salt and dried out before assemblage. Impregnation with oil for waterproofing, as described previously, can be accomplished either prior or subsequent to the impregnation with the magnesium salt.

To show the efficacy of a small addition of a magnesium salt, a test may be cited in which 3 grams of magnesium chlorid were added to the 450 cc. of electrolyte in a cell of the structure shown in the accompanying figure. In this cell only one sixteenth inch of water accumulated in the air chamber of the carbon electrode during the year covered by the test. The cell with magnesium chlorid does not seem to allow the solution to have ready access to the inner chamber of the carbon.

The design of cell shown in the figure is capable of considerable variation without departing from the scope of the present invention. The electrodes may be supported by resting on the bottom of the jar. The chamber in the carbon electrode can be eliminated, if the cross section of the air conduit is correspondingly increased. Various other modifications which fall within the scope of the following claims will be immediately evident to those skilled in the art.

What we claim is:

1. In an air depolarized primary cell employing an alkaline electrolyte, an activated carbon electrode immersed in said electrolyte, provided with a central air chamber beneath the level of but out of communication with said electrolyte and with a single conduit of small cross section connecting said air chamber with atmospheric air, and sealing means between said conduit and said electrode preventing access of electrolyte to said air chamber, the conduit being so arranged as to preclude circulation of air, so that depolarization takes place solely by diffusion of oxygen, and evaporation of the electrolyte and contamination thereof with $CO_2$ are minimized.

2. In an add-water type air depolarized primary cell, a container sealed from communication with air, a hollow, activated carbon electrode mounted within said container in such position as to be completely submerged upon addition of water, a single conduit of small cross section leading from the interior of said carbon electrode to the atmospheric air to furnish air for diffusion into the electrode chamber for depolarizing the electrode, and a cake of caustic alkali mounted within said container surrounding said conduit in a position to dissolve upon the addition of water, thereby forming electrolyte for said cell.

3. In an air depolarized primary cell employing an alkaline electrolyte, a container, a cover for the container sealing it against access of air an air conduit adapted to have access to the atmosphere, a chambered activated carbon electrode, mounted in such manner that upon addition of water the active part of said electrode is completely submerged, having its chamber communicating with said conduit, a zinc electrode and a cake of caustic alkali; the said air conduit supporting said carbon electrode and said cake of alkali; said air conduit and said zinc electrode being suspended from said cover.

4. The structure of claim 3 in which a body of absorbent material saturated with oil is also supported by said air conduit.

5. In an air-depolarized primary cell adapted for use with an alkaline electrolyte, a container, a cover for the container sealing the interior from the air, an activated carbon depolarizing electrode provided with a central air chamber and mounted in such manner that upon addition of water it is completely submerged beneath the normal liquid level of the electrolyte, said air chamber being sealed from communication with the electrolyte, a single conduit of small cross section extending above the liquid level and open at its top so as to connect said chamber with the air, a zinc electrode suitably spaced from the carbon electrode and means for holding the electrodes in spaced relationship in the container, the conduit and chamber forming a closed system open to the air at only one place so that circulating currents of air through the chamber are prevented and depolarization takes place solely by diffusion of oxygen.

6. An add-water type of air depolarized primary cell adapted for use with an alkaline electrolyte, said cell comprising a container, a cover for the container sealing the interior from the air, an activated carbon depolarizing electrode provided with a central air chamber and mounted in such manner that upon addition of water it is submerged beneath the normal surface of the electrolyte, said air chamber being out of communication with the electrolyte, conduit means supporting and providing breathing means for said depolarizing electrode connecting said chamber with the air, a zinc electrode suitably spaced from the carbon electrode, means for holding the electrodes in spaced relationship in the container, a block of caustic alkali mounted in the casing sufficient in weight to furnish an alkaline electrolyte upon adding water, and a supply of oil carried in the casing and adapted to be released on the surface of the electrolyte upon filling the cell with water.

MARTIN L. MARTUS.
EDMUND H. BECKER.